United States Patent
Yee et al.

(10) Patent No.: US 7,688,572 B2
(45) Date of Patent: Mar. 30, 2010

(54) MOTOR CONTROL CENTER SUBUNIT HAVING MOVEABLE LINE CONTACTS AND METHOD OF MANUFACTURE

(75) Inventors: Edgar Yee, Chapel Hill, NC (US); Robert Allan Morris, Fayetteville, NC (US); Scott Edward McPherren, Wauwatosa, WI (US); Neal Edward Rowe, Ashville, NC (US)

(73) Assignee: Eaton Corporation, Cleveland, OH (US)

( * ) Notice: Subject to any disclaimer, the term of this patent is extended or adjusted under 35 U.S.C. 154(b) by 415 days.

(21) Appl. No.: 11/625,088

(22) Filed: Jan. 19, 2007

(65) Prior Publication Data
US 2008/0023211 A1 Jan. 31, 2008

Related U.S. Application Data

(60) Provisional application No. 60/833,380, filed on Jul. 26, 2006.

(51) Int. Cl.
*H02B 13/02* (2006.01)
*H02B 7/00* (2006.01)
*H02B 11/12* (2006.01)
*H01H 9/00* (2006.01)

(52) U.S. Cl. .................. 361/614; 361/605; 361/608; 361/611; 361/622; 361/624; 200/50.21; 200/50.08; 200/50.11

(58) Field of Classification Search ................. 361/616, 361/605, 608, 611, 614, 622, 624; 200/50.21, 200/50.08, 50.11
See application file for complete search history.

(56) References Cited

U.S. PATENT DOCUMENTS

| | | | | | |
|---|---|---|---|---|---|
| 3,303,395 | A | * | 2/1967 | Eck | 361/608 |
| 3,469,043 | A | * | 9/1969 | Wilson | 200/50.26 |
| 3,482,143 | A | * | 12/1969 | Bugni et al. | 361/608 |
| 3,495,135 | A | * | 2/1970 | Paape | 361/608 |
| 3,626,253 | A | * | 12/1971 | Sturdivan | 361/608 |
| 3,633,075 | A | * | 1/1972 | Hawkins | 361/616 |
| 3,896,353 | A | * | 7/1975 | Burton et al. | 361/609 |
| 4,024,441 | A | * | 5/1977 | Coyle et al. | 361/624 |
| 4,038,585 | A | * | 7/1977 | Wolski et al. | 361/624 |
| 4,068,287 | A | * | 1/1978 | Kruzic et al. | 361/611 |
| 4,077,687 | A | * | 3/1978 | Farag | 439/251 |
| 4,090,230 | A | * | 5/1978 | Fuller et al. | 361/617 |
| 4,118,607 | A | * | 10/1978 | Shaffer | 200/50.15 |
| 4,121,276 | A | * | 10/1978 | Kovatch et al. | 361/614 |
| 4,178,624 | A | * | 12/1979 | Wilson et al. | 361/611 |
| 4,180,845 | A | * | 12/1979 | Shariff et al. | 361/624 |
| 4,233,643 | A | * | 11/1980 | Iverson et al. | 361/616 |
| 4,355,269 | A | * | 10/1982 | Burton et al. | 318/436 |

(Continued)

FOREIGN PATENT DOCUMENTS

DE  10006427 A1 *  8/2001

*Primary Examiner*—Jayprakash N Gandhi
*Assistant Examiner*—Bradley H Thomas
(74) *Attorney, Agent, or Firm*—Ziolkowski Patent Solutions Group, SC

(57) ABSTRACT

A system and method for connecting supply power to motor control components includes use of a motor control center subunit with moveable supply power contacts. After a motor control center subunit is secured into a motor control center compartment, the supply power contacts may be advanced to engage supply power buses. For disconnection, the supply power contacts may be retracted and isolated from the buses before physical removal of the subunit.

31 Claims, 10 Drawing Sheets

U.S. PATENT DOCUMENTS

| | | | | |
|---|---|---|---|---|
| 4,427,854 A | * | 1/1984 | Kleinecke et al. | 200/50.21 |
| 4,447,858 A | * | 5/1984 | Farag et al. | 361/829 |
| 4,502,097 A | * | 2/1985 | Takahashi | 361/614 |
| 4,621,303 A | * | 11/1986 | Rowe | 361/608 |
| 4,652,966 A | * | 3/1987 | Farag et al. | 361/189 |
| 4,693,132 A | * | 9/1987 | Buxton et al. | 74/425 |
| 4,713,501 A | * | 12/1987 | Herrmann | 200/50.22 |
| 4,728,757 A | * | 3/1988 | Buxton et al. | 200/50.21 |
| 4,743,715 A | * | 5/1988 | Gerbert-Gaillard et al. | 200/50.26 |
| 4,760,220 A | * | 7/1988 | Fritsch et al. | 200/50.11 |
| 4,768,967 A | * | 9/1988 | Fritsch | 439/152 |
| 4,789,344 A | * | 12/1988 | Fritsch et al. | 439/43 |
| 4,789,919 A | * | 12/1988 | Cox et al. | 361/609 |
| 4,853,830 A | * | 8/1989 | Corfits et al. | 361/725 |
| 4,860,161 A | * | 8/1989 | Maki et al. | 361/608 |
| 4,926,286 A | * | 5/1990 | Maki et al. | 361/617 |
| 5,019,676 A | * | 5/1991 | Heckenkamp | 200/50.18 |
| 5,337,210 A | * | 8/1994 | Ishikawa et al. | 361/608 |
| 5,424,910 A | * | 6/1995 | Lees | 361/615 |
| 5,424,911 A | * | 6/1995 | Joyner et al. | 361/616 |
| 5,459,293 A | * | 10/1995 | Hodkin et al. | 200/50.26 |
| 5,481,075 A | * | 1/1996 | Kleinecke et al. | 200/50.21 |
| 5,486,663 A | * | 1/1996 | Fritsch et al. | 200/50.21 |
| 5,495,388 A | * | 2/1996 | Bonetti et al. | 361/609 |
| 5,510,960 A | * | 4/1996 | Rosen | 361/823 |
| 5,530,414 A | * | 6/1996 | Reynolds | 335/126 |
| 5,568,033 A | * | 10/1996 | Brunson | 318/778 |
| 5,592,360 A | * | 1/1997 | Beck et al. | 361/626 |
| 5,642,256 A | * | 6/1997 | Pugh et al. | 361/615 |
| 6,015,958 A | * | 1/2000 | Pomatto et al. | 200/330 |
| 6,087,602 A | * | 7/2000 | Bernier et al. | 200/50.11 |
| 6,207,909 B1 | * | 3/2001 | Tallman et al. | 200/50.02 |
| 6,284,989 B1 | * | 9/2001 | Bernier et al. | 200/50.12 |
| 6,414,839 B1 | * | 7/2002 | Derksen | 361/617 |
| 6,435,631 B1 | * | 8/2002 | Yee et al. | 312/204 |
| 6,512,669 B1 | * | 1/2003 | Goodwin et al. | 361/601 |
| 6,531,670 B1 | * | 3/2003 | Pugh | 200/329 |
| 6,700,062 B1 | * | 3/2004 | Allen, Jr. | 174/53 |
| 6,717,076 B2 | * | 4/2004 | Narusevicius et al. | 200/50.24 |
| 6,831,226 B2 | * | 12/2004 | Allen, Jr. | 174/53 |
| 6,861,596 B2 | * | 3/2005 | Schnackenberg | 200/43.01 |
| 6,864,443 B1 | * | 3/2005 | Bruchmann | 200/50.01 |
| 6,878,891 B1 | * | 4/2005 | Josten et al. | 200/293 |
| 6,951,990 B1 | * | 10/2005 | Miller | 200/50.21 |
| 7,019,230 B1 | * | 3/2006 | Vaill et al. | 200/50.24 |
| 7,292,422 B2 | * | 11/2007 | Culligan et al. | 361/93.2 |
| 7,311,538 B2 | * | 12/2007 | West | 439/211 |
| 7,525,809 B2 | * | 4/2009 | Bergmann et al. | 361/752 |
| 7,544,908 B2 | * | 6/2009 | Webb et al. | 200/50.24 |
| 2004/0166729 A1 | * | 8/2004 | Allen, Jr. | 439/535 |
| 2006/0067018 A1 | * | 3/2006 | Malkowski, Jr. et al. | 361/2 |

* cited by examiner

MOTOR CONTROL CENTER SUBUNIT HAVING MOVEABLE LINE CONTACTS AND METHOD OF MANUFACTURE

CROSS-REFERENCE TO RELATED APPLICATION

The present invention claims the benefit of U.S. provisional application Ser. No. 60/833,380, filed Jul. 26, 2006.

BACKGROUND OF THE INVENTION

The present invention relates generally to a system and method for motor control, and more particularly, to a subunit for a motor control center which connects motor control components to supply power, and a method of manufacture thereof. The system and method described herein provide for connection of the supply power to the motor control components after full installation of the motor control center subunit into the motor control center.

A motor control center is a multi-compartment steel enclosure with a bus system to distribute electrical power, on a common bus system, to a plurality of individual motor control units mountable within the compartments. The individual motor control units are commonly referred to as "buckets" and are typically constructed to be removable, pull-out units that have or are installed behind individual sealed doors on the motor control center enclosure. These buckets may contain various motor control and motor protection components such as motor controllers, starters, contactor assemblies, overload relays, circuit breakers, motor circuit protectors, various disconnects, and similar devices for operating high voltage motors. The buckets connect to the supply power lines of the motor control center and conduct supply power to the line side of the motor control devices, for operation of motors. Motor control centers are most often used in factories and industrial facilities which utilize high power electrical motors, pumps, and other loads.

Typically, when installing or removing motor control center buckets, the power supply lines are connected or interrupted. To remove such a bucket, a deadfront door of the bucket or of the motor control center is opened and an operator manually pulls on the bucket to separate the primary disconnects, or "stabs," from the bus system, thereby disconnecting power supply. Installation of a bucket is accomplished in a similar manner, wherein the operator manually pushes the bucket into a compartment of the motor control center to engage the bucket stabs with the bus system, and thus connect the system to supply power. The line connections or stabs may be difficult to maneuver manually when an operator is supporting the entire bucket or when the stabs are not visible.

Attempts have been made to improve upon the manual installation and disconnection of motor control center buckets and supply power connections from live supply power lines, risers, and/or a vertical bus of a motor control center. Other systems have employed pivotable handles inside the buckets to pivot line connectors to and from supply lines. However, many of these systems require that the bucket or compartment door be open to manipulate the handles and line stabs.

It would therefore be desirable to design a motor control center bucket assembly that overcomes the aforementioned drawbacks. Thus, it would be desirable to provide for remote connection or disconnection of the line stabs of a bucket to the power supply lines or bus of a motor control center from a distance. In the event of an arc or arc flash, any heated gas, flame, and/or the arc itself should preferably be contained behind the bucket compartment door or "deadfront."

BRIEF DESCRIPTION OF THE INVENTION

The present invention provides a system and method for installing a motor control center subunit or bucket into a motor control center and electrically connecting motor control components of the bucket to a power supply. The system and method utilize moveable line stabs to engage the power supply (such as a series of bus bars) after the bucket has been secured in the motor control center, in order to contain potential arc flashes.

Therefore, in accordance with one aspect of the present invention, a control module for a motor control center is provided. The control module includes a housing having a plurality of conductive contacts therein. The housing has a front panel and is designed to seat in a motor control center whereupon the front panel forms a front face of the motor control center. The control module also includes an engagement mechanism which is attached to the housing and is in operable association with the plurality of conductive contacts. The engagement mechanism moves the plurality of conductive contacts between a retracted position and an extended position while the control module housing is seated in the motor control center and the front panel is in a closed position.

In accordance with another aspect of the invention, a method of manufacturing a control module for a motor control center is provided. The method includes assembling a control module housing to have at least a front panel and to seat in a motor control center, disposing a moveable guide within the control module housing to guide motion of at least one supply contact from a first position to a second position, attaching the at least one supply contact to the moveable guide, and providing for advancement of the at least one supply contact and the moveable guide when the front panel of the control module housing is secured against the motor control center compartment.

According to a further aspect of the invention, a motor control center subunit includes a subunit housing, an actuating mechanism, and an isolator assembly. The subunit housing is designed to be installed in a motor control center. The actuating mechanism is disposed within the subunit housing and is constructed to move a plurality of line connectors between a retracted position and an extended position. The isolator assembly is configured to electrically shield the plurality of line connectors prior to engagement of the plurality of line connectors with a line power.

In accordance with another aspect of the invention, a motor control center is provided that includes a frame and at least one control unit. The frame encloses a supply power bus and has at least one compartment. The at least one control unit is configured for substantially sealed installation in the at least one compartment, and includes at least one supply power contact, a drive configured to move the at least one supply power contact for engagement and disengagement with the supply power bus, and a drive actuator designed to actuate the drive from without the control unit when the control unit is installed in the at least one compartment.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The following description makes reference to supply power, supply power lines, motor power, load power, line power, and the like. It is appreciated that such terms may refer to a variety of both common and uniquely conditioned voltage and current characteristics, including but not limited to, three phase AC power, single phase AC power, DC power, multiple DC power lines, or any combination thereof. Such power characteristics will be generally referred to as being provided on a bus, supply line, or riser of a motor control center. However, it is appreciated that the present invention may find applicability in other power connectivity configurations, adapted or apart from motor control centers. An example of supply power commonly used in motor control centers is 480V three-phase AC power distributed over three separate supply buses.

Figure 1:
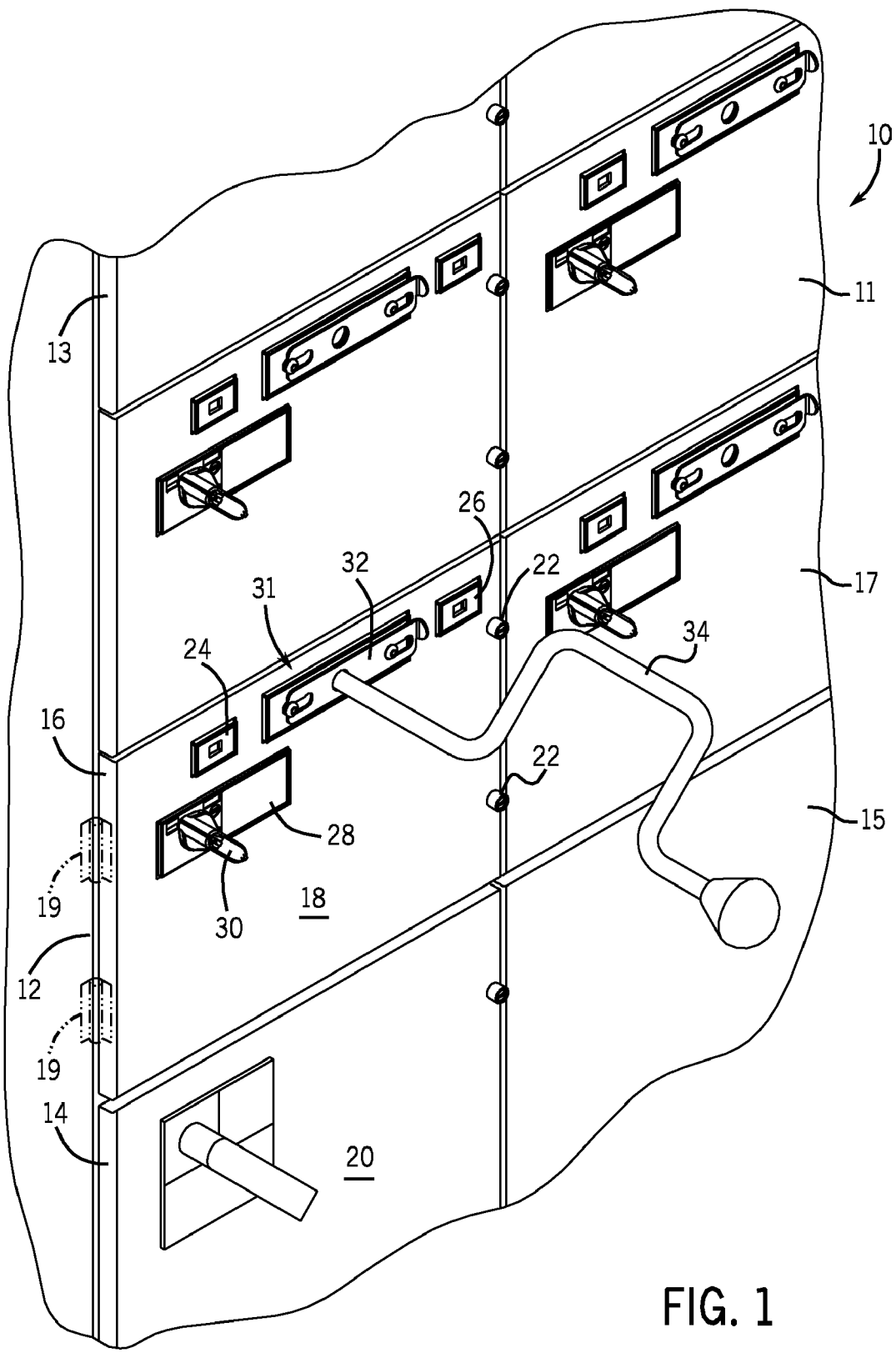
FIG. 1 is a partial perspective view of a motor control center subunit installed in a motor control center.

Referring to FIG. 1, a partial perspective view of a motor control center structure 10 is shown. As discussed above, motor control centers may include compartments or enclosures for multiple control modules or buckets 11, 13, 14, 15, 16, 17. Bucket 16 is shown fully installed into motor control center compartment or enclosure 12 such that its front panel 18 is sealed securely against the periphery of enclosure 12 and flush with the front panel 20 of bucket 14. In this regard, bucket 16 includes a number of latching mechanisms 22 on front panel 18 so that an operator may lock bucket 16 into place once installed. In some embodiments, front panel 18 may be a door having a set of hinges 19 in order to permit access to components within bucket 16 while bucket 16 is installed in enclosure 12 of motor control center 10. However, even when closed or sealed, front panel or door 18 still permits access to circuit breaker assembly 28, optional indicators 24, 26, and line contact actuator 31. Line contact actuator 31 is a mechanism for engaging line contacts (FIG. 2) with line power from the motor control center 10. Thus, even when bucket 16 is fully installed in enclosure 12 and latches 22 have been secured, an operator may still use circuit breaker handle 30 and may open slide 32 to insert crank 34 to move one or more stabs (not shown) of the bucket 16.

Figure 2:
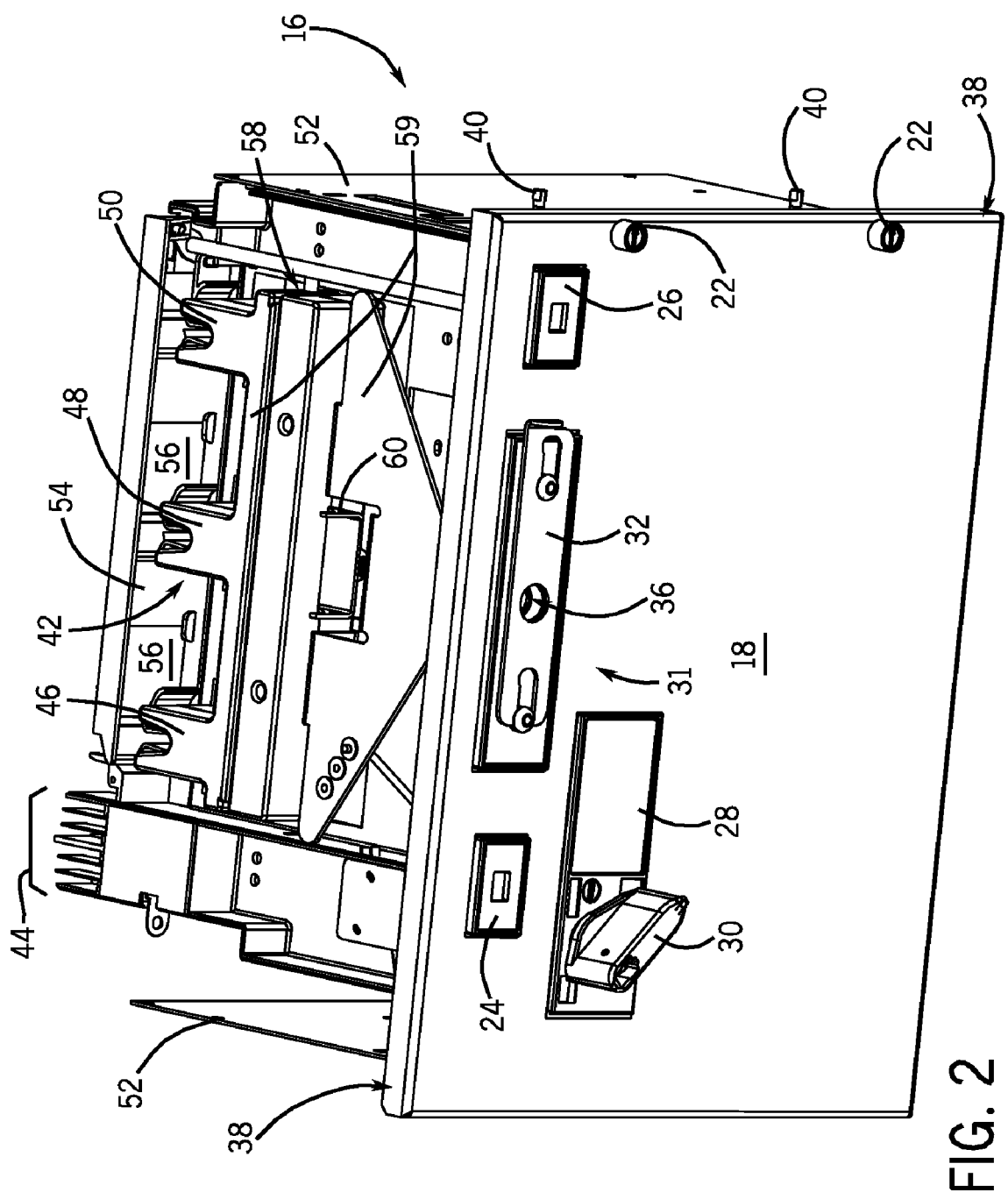
FIG. 2 is a perspective view of the motor control center subunit of FIG. 1, removed from the motor control center.

Referring now to FIG. 2, a perspective view of a motor control center bucket 16 is shown. It is noted that bucket 16 may have a housing that includes a number of panels surrounding bucket 16 to fully or partially enclose the components thereof. As shown, bucket 16 includes a pair of side panels 52 and a front panel 18, which support motor control devices and internal bucket components. An upper panel and a rear panel have been removed to show the internal components of bucket 16. Front panel 18 is configured to fit snugly and securely within a motor control center such that a rim 38 of the front panel 18 seats against the inner periphery (not shown) of a motor control center enclosure. For purposes of dust protection, rim 38 may optionally include a compressible or flexible seal, such as a rubber seal, or other gasket-type component. Once bucket 16 is inserted into a motor control center enclosure, latch mechanisms 22 may be turned with a key, a screwdriver, or by hand so that latch arms 40 abut an inner surface of the outer periphery (not shown) of an enclosure to hold bucket 16 in place and/or prevent bucket 16 from being removed. Similarly, an automatic latch 60 is shown in an engaged position. Upon advancement of line contacts or stabs 46, 48, 50 automatic latch 60 is triggered to engage a frame or lip of the motor control center unit in which bucket 16 is installed.

When slide 32 of line contact actuator 31 is moved aside, an opening 36 is exposed. Opening 36 preferably has a unique configuration to accept a specialized crank 34 (as shown in FIG. 1). In other embodiments, to be described below, a manually drivable handle may extend through opening 36 or a remotely operable motor may be the actuator 31. When slide 32 is moved aside as shown, slide 32 extends over a portion of front panel 18. Thus, in embodiments in which front panel 18 is a hinged door, moving slide 32 to expose opening 36 will inhibit a user from opening front panel 18.

Bucket 16 also includes a number of conductive line contacts or stabs 44, 46, 48, 50. Control power contact 44 is preferably fixedly attached to the rear of bucket 16, whereas supply power stabs 46, 48, 50 are moveable with respect to bucket 16. However, it is appreciated that control power contact 44 may also be moveable in a similar manner to line power stabs 46, 48, 50. Control power contact 44 is of a suitable construction to conduct a control power (typically a few volts) to motor control components (not shown) disposed within bucket 16. In embodiments where control power contact 44 is permanently positioned at the rear of bucket 16, control power contact 44 will engage a control power supply line or bus 47 upon installation of bucket 16 into a motor control center.

Supply power stabs 46, 48, 50, on the other hand, do not engage supply power lines or buses when bucket 16 is installed into a motor control center. Rather, stabs 46, 48, 50 are initially in retracted position 42, as shown in FIG. 2, disposed inside bucket 16. One of skill in the art will appreciate that a number of configurations of supply power stabs 46, 48, 50 may be utilized. In the embodiment shown, stabs 46, 48, 50 are shaped to grasp about a supply line, bus, or riser of the motor control center 10 of FIG. 1. A line contact or stab assembly 58 includes a stab bracket 59 to which the stabs 46, 48, 50 are attached. Stab bracket 59 holds stabs 46, 48, 50 in an orientation for subsequent engagement with the supply power lines or buses of motor control center 10 of FIG. 1. It is recognized, however, that stab assembly 58 of FIG. 2 may include any number of configurations, such as for independently moveable stabs, for other than three stabs, or for actuation by other than a shaft, as will be described below. A shutter or isolator assembly 54 is disposed in the rear of bucket 16, between stab assembly 58 and the exterior of bucket 16. Isolator assembly 54 includes a number of moveable shutters 56 which operate to either expose or isolate the stabs 46, 48, 50 from the power lines or buses of the motor control center 10 of FIG. 1.

Figure 3:
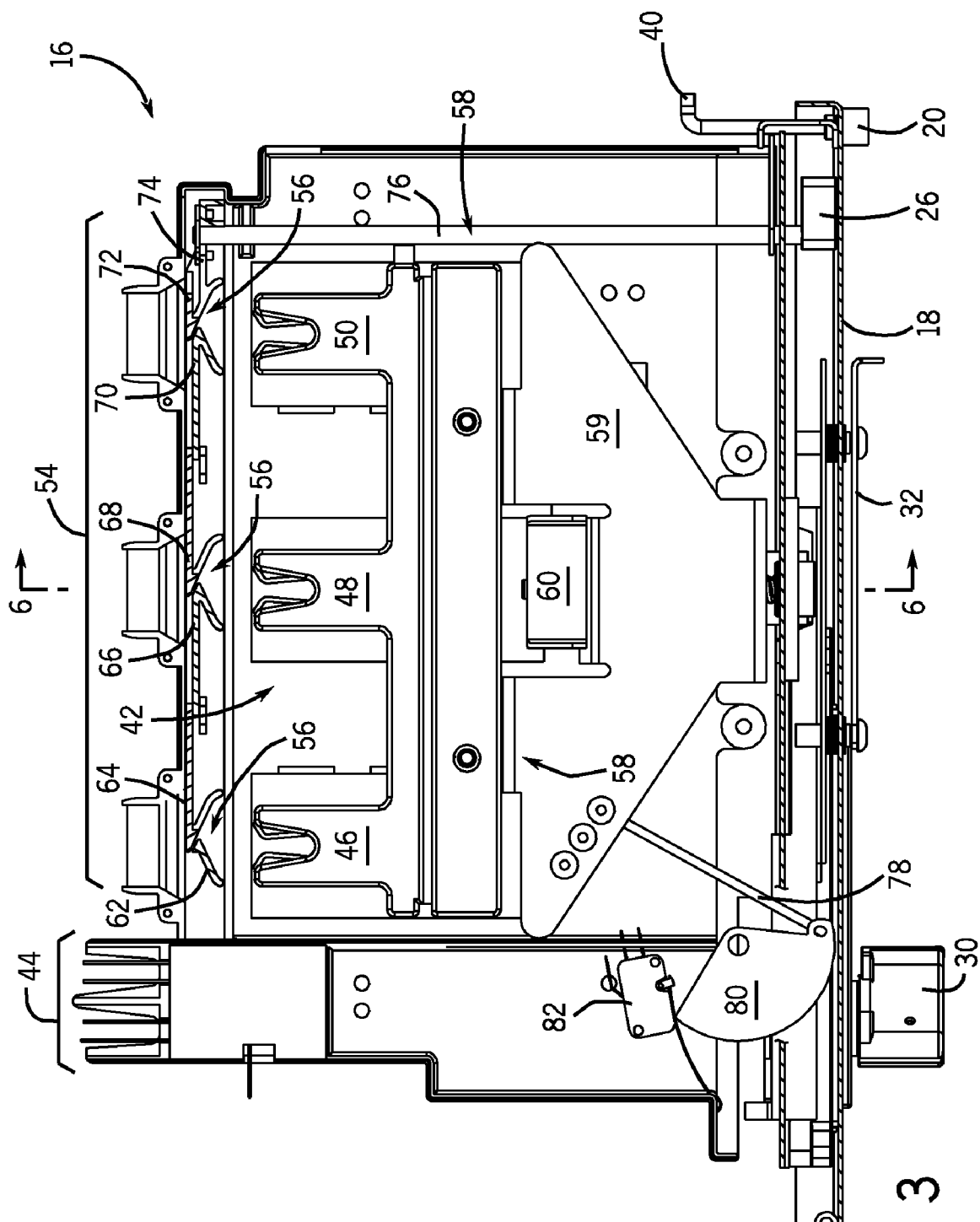
FIG. 3 is a top view of the motor control center subunit of FIG. 1 showing a number of stabs in a retracted position.

FIG. 3 depicts a top view of bucket 16, with all housing panels removed except for front panel or door 18. As shown, stab assembly 58 has positioned stabs 46, 48, 50 in a retracted position 42 wherein the stabs 46, 48, 50 are located inside bucket 16. Accordingly, shutters 56 of shutter assembly 54 are closed, isolating the stabs 46, 48, 50 from the supply power bus or line of a motor control center such as shown in FIG. 1. As shown in FIG. 3, each shutter 56 includes two separate shielding members 62 and 64, 66 and 68, 70 and 72. The shutter 56 for stab 46 includes a left shielding portion 62 and a right shielding portion 64, each being angled toward stab 46. Likewise the shutters 56 for stabs 48 and 50 include left shielding portions 66, 70 and right shielding portions 68, 72 respectively, each being angled toward the corresponding stab. However, the shutter 56 for stab 50 includes an additional mechanical connection 74. That is, a shutter arm 74 is provided to control a shutter indicating mechanism 76 which displays to an operator via front panel indicator 26 whether the shutters 56 are open or closed, as will be described in further detail below. Similarly, a cam or bell crank 80 is attached via rod 78 to stab assembly 58 to translate movement of the stab to a microswitch 82. Microswitch 82 operates to turn on and off the supply of control power from control power contact 44 to motor control components, such as contactors or overload relays (not shown), of bucket 16.

Figure 4:
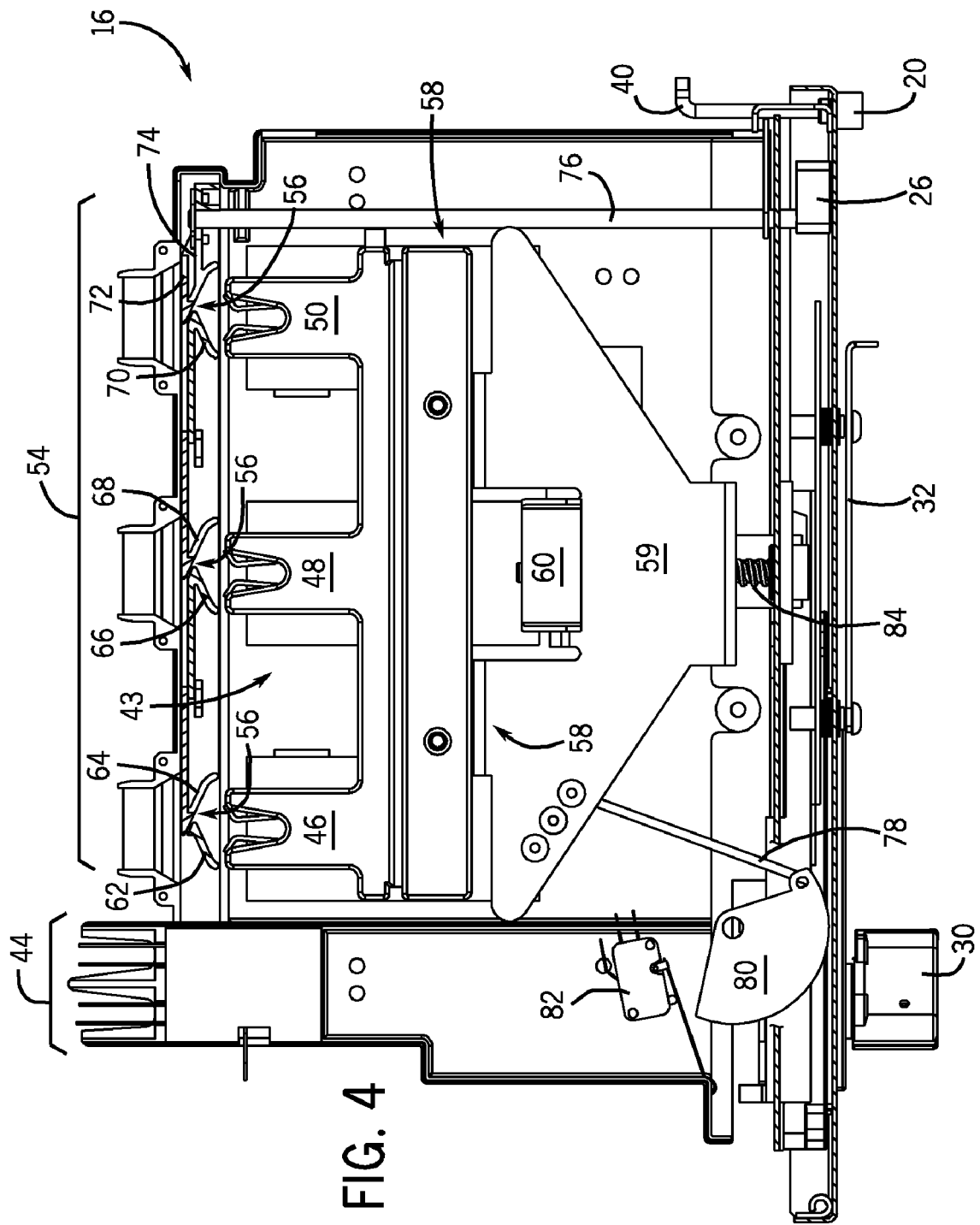
FIG. 4 is top view of the motor control center subunit of FIG. 3 showing the stabs in a test position.

Referring now to FIG. 4, the bucket 16 is shown having the stab assembly 58 in a test position 43. Stabs 46, 48, and 50 have been advanced to a point or test position 43 at which they nearly touch or just touch shutters 56, but shutters 56 are still closed. Since shutters 56 are closed, stabs 46, 48, 50 are isolated from supply power buses, thus preventing arcs from occurring between stabs 46, 48, 50 and the buses. Being in the test position, stab bracket 59 is moved forward such that actuating shaft or drive 84 is visible. Preferably, shaft 84 is a rotary drive shaft and is connected to the socket of opening 36 shown in FIG. 2 for operation via crank 34, shown in FIG. 1. Referring back to FIG. 4, during the advancement of stab assembly 58, automatic latch 60 has been triggered to engage the enclosure of the motor control center into which bucket 16 has been installed. Also due to the advancement of stab assembly 58, rod 78 is pulled by stab bracket 59 such that cam 80 has rotated away from microswitch 82. Microswitch 82 is thus actuated to permit control voltage from the control power contact 44 to a motor control component, such as a contactor or overload relay (not shown). It is appreciated, however, that microswitch 82, cam 80 and rod 78 are optional. In other words, embodiments of the present invention may simply permit control voltage to pass through control power contact 44 directly to motor control components immediately upon installation of bucket 16 into a motor control center when contact 44 engages a control power bus.

Figure 5:
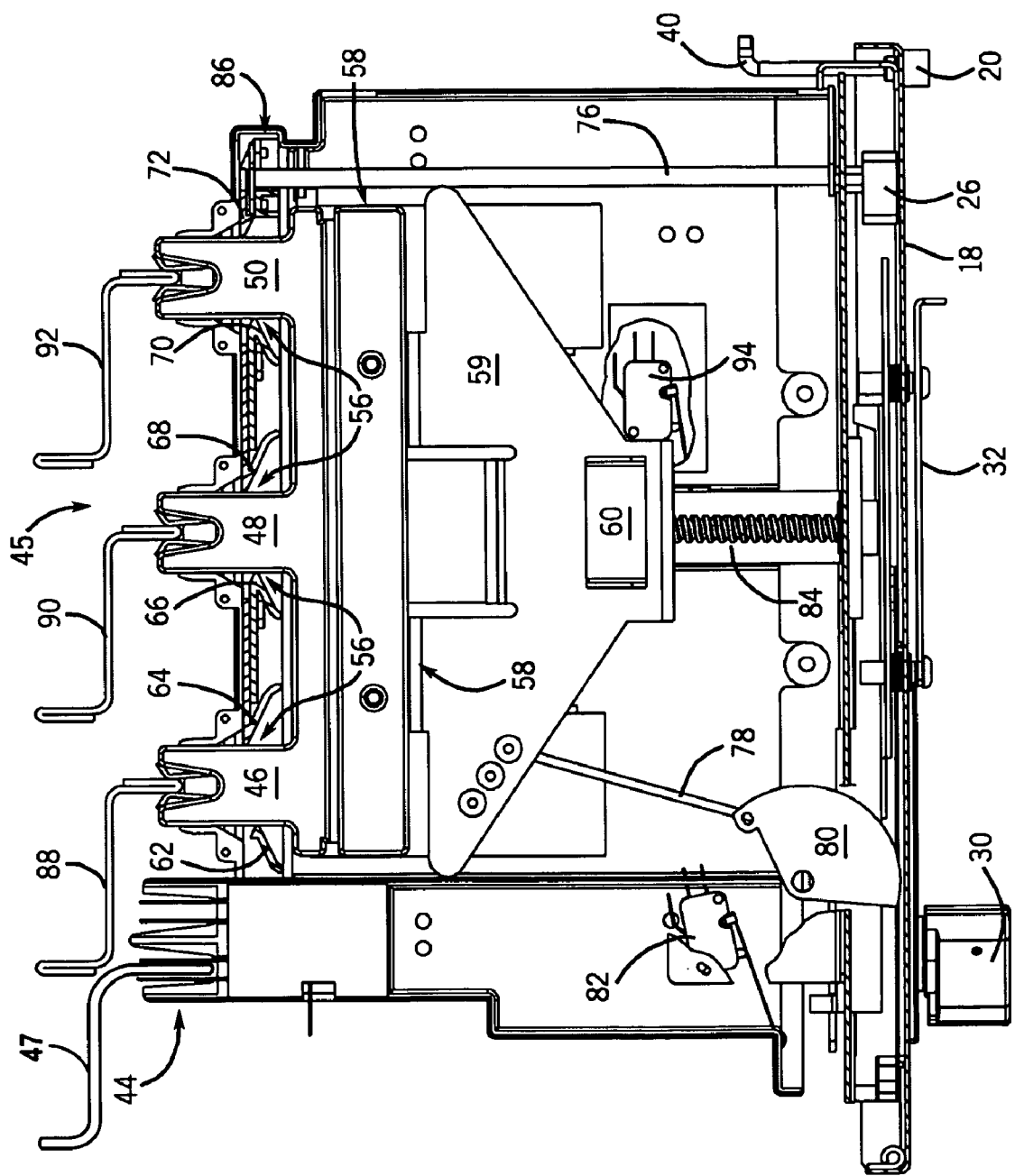
FIG. 5 is a top view of the motor control center subunit of FIG. 4 showing the stabs in an extended position.

FIG. 5 depicts another top view of the bucket 16 wherein the stabs 46, 48, 50 are in an extended/engaged position 45. In operation, stabs 46, 48, 50 are advanced or extended from the test position 43 of FIG. 4 towards shutters 56 and impinge upon angled portions 62-72 of the shutters 56. As the stabs 46, 48, 50 are forced forward into and against the surfaces of shutters 56, the stabs 46, 48, 50 separate the left angled portions 62, 66, 70 and right angled portions 64, 68, 72 of the shutters 56 to expose the stabs 46, 48, 50 to supply power buses 88, 90, 92, respectively. Preferably, a biasing or closure force is provided to bias the right angled portions 64, 68 72 and the left angled portions 62, 66, 70 towards one another, so that the shutters 56 automatically close upon retraction of stabs 46, 48, 50. It is recognized that numerous other ways of opening and closing shutters 56 are possible and contemplated. For example, rather than employing two shutter portions for each shutter, one shutter portion having one beveled surface could be slid aside by the advancement of the stabs. Or, the shutters could be connected for manipulation by the turning of rotary shaft 84. Thus, the shutters 56 could comprise one or several sliding panels with or without beveled surfaces. In other words, shutters 56 may be operated to open and close by the movement of the stabs, by the movement of the stab assembly, by the turning of the actuating shaft, by other actuating components, or by a manual control. Regardless, once the stabs 46, 48, 50 have penetrated through shutters 56, the stabs 46, 48, 50 may be advanced or extended to engage power supply bus bars 88, 90, 92.

Also shown in FIG. 5 is a second microswitch 94 connected to activate and deactivate circuit breaker 28 (FIG. 2). When stabs 46, 48, 50 reach the fully engaged position 45 with bus bars 88, 90, 92, stab bracket 59 of stab assembly 58 actuates microswitch 94. Microswitch 94 permits closure of circuit breaker 28 (FIG. 2), completing the circuit between bus bars 88, 90, 92 and the line side of motor control components (not shown) in bucket 16.

Likewise, for removal of bucket 16, circuit breaker 28 (FIG. 2) is opened, disconnecting supply power to the motor control devices (not shown) of bucket 16. Stabs 46, 48, 50 may then be retracted from bus bars 88, 90, 92 by a reverse motion of rotary shaft 84. Once stabs 46, 48, 50 pass shutters 56, the right and left portions 62-72 thereof will automatically close together to isolate the stabs from bus bars 88, 90, 92. Preferably, the shutter portions 62-72 and all or some of the housing panels, including front panel 18 and a rear panel (not shown), of bucket 16 are plastic or other insulating material. After stabs 46, 48, 50 have been fully retracted, automatic latch 60 will release from engagement with the motor control center, and an operator may then slide bucket 16 out of the motor control center.

Figure 6:
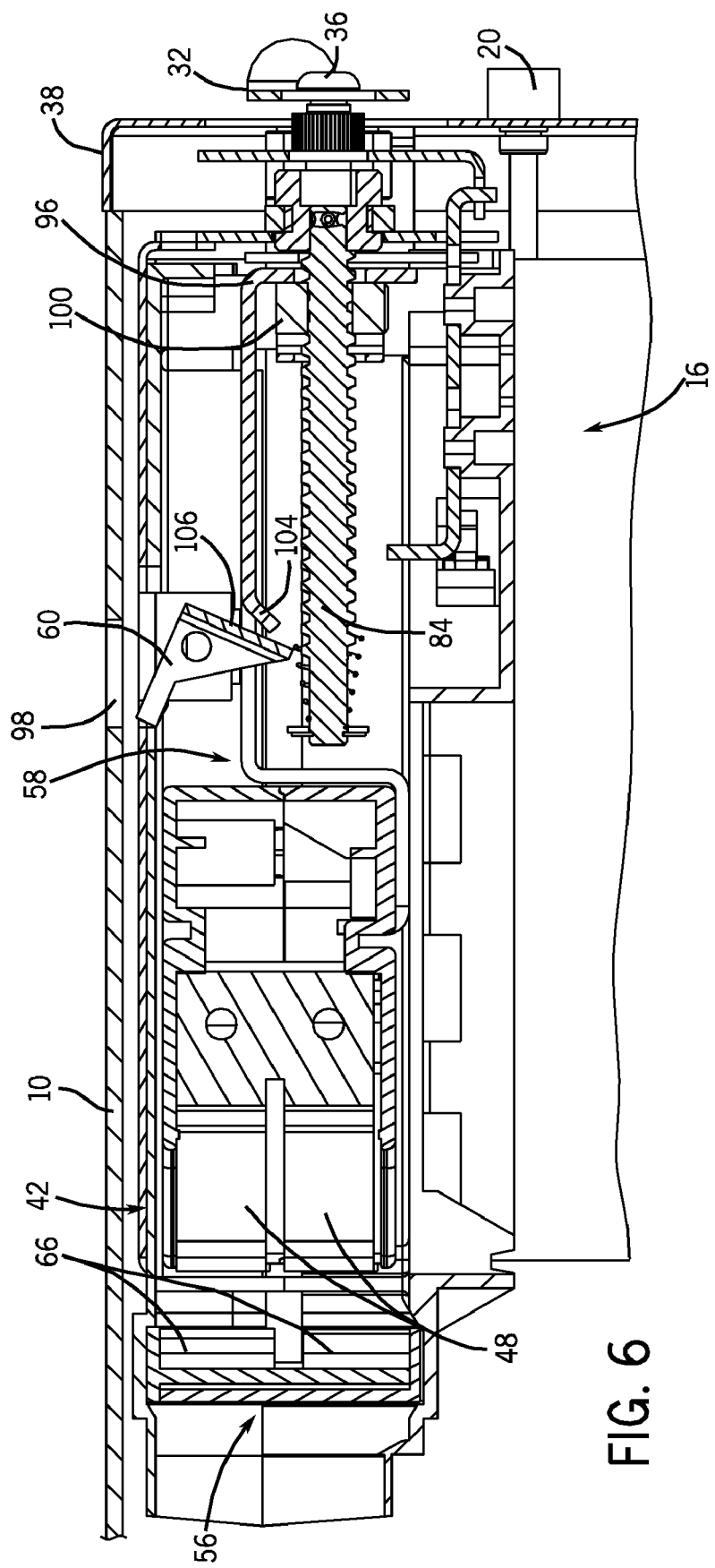
FIG. 6 is a cross-sectional view of the motor control center subunit of FIG. 3 taken along line 6-6 of FIG. 3.

Referring now to FIG. 6, a cross-sectional view of bucket 16 taken along line 6-6 of FIG. 3 is shown. The left angled portion 66 of a shutter 56 is shown isolating the central stab 48, since stab 48 is in the retracted position 42 of FIG. 3. In FIG. 6, it can be seen that stab assembly 58 holds stab 48 in position and engages rotary shaft 84, shown in section. Therefore, FIG. 6 illustrates the moving components used to actuate a stab 48. An operator may use a ratchet or crank (not shown) through opening 36 of slide 32 to turn rotary shaft or worm gear 84. A stab guide 96 includes a thread bearing 100 to transform the rotational motion of rotary shaft 84 into a translational motion of stab assembly 58. Thus, rotary shaft 84 and stab guide 96 may generally be referred to as a racking-type actuating mechanism for extending and retracting the stabs 46, 48, 50, relative to bucket 16. As stab assembly 58 is racked or otherwise advanced towards the extended or engaged position 45 shown in FIG. 5 (i.e. a motion to the left, as oriented in FIG. 6) stab 48 will impinge upon shutters 66. Also, a sloped lip 104 of stab assembly 58 will strike a bottom portion 106 of latch 60. As sloped lip 104 follows the advancing motion of the stab assembly 58, it will rotate latch 60 into an upward position wherein bottom portion 106 rests on stab guide 96 and latch 60 extends through a groove 98 of motor control center 10, shown in FIG. 1, to retain bucket 16 therein.

Figure 7:
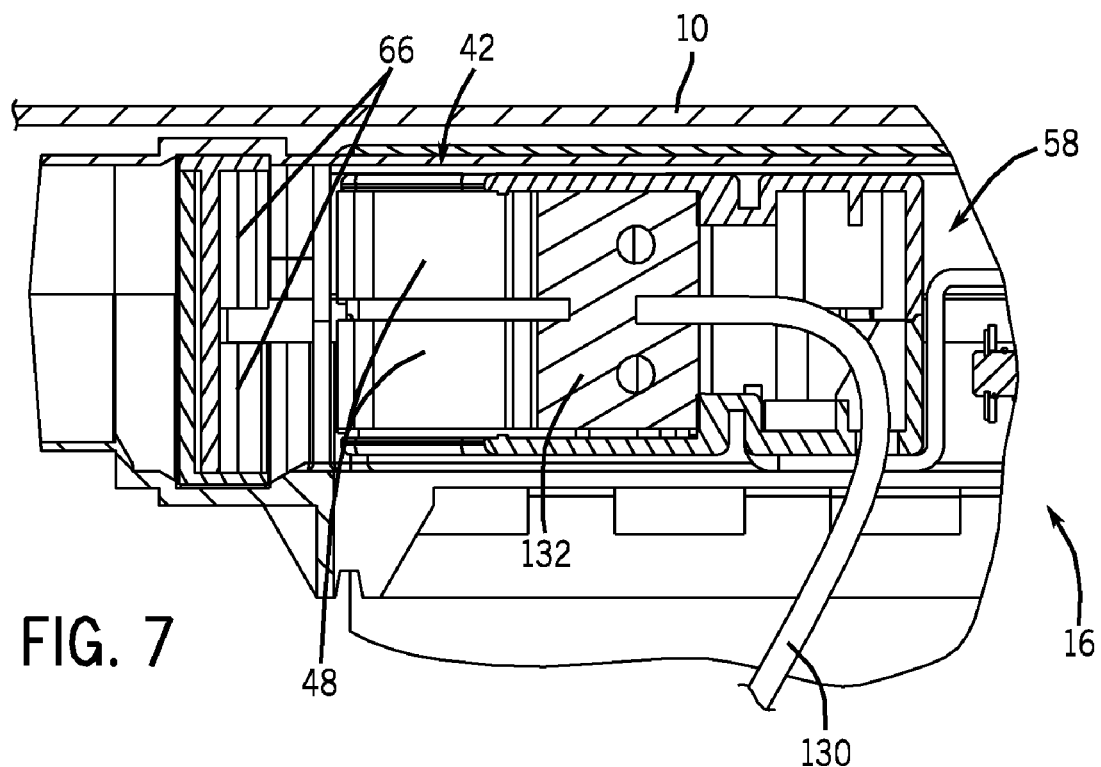
FIG. 7 is a detailed view of a portion of the motor control center subunit of FIG. 6 showing an arc shield, line contact, and supply conductor thereof.
Figure 8:
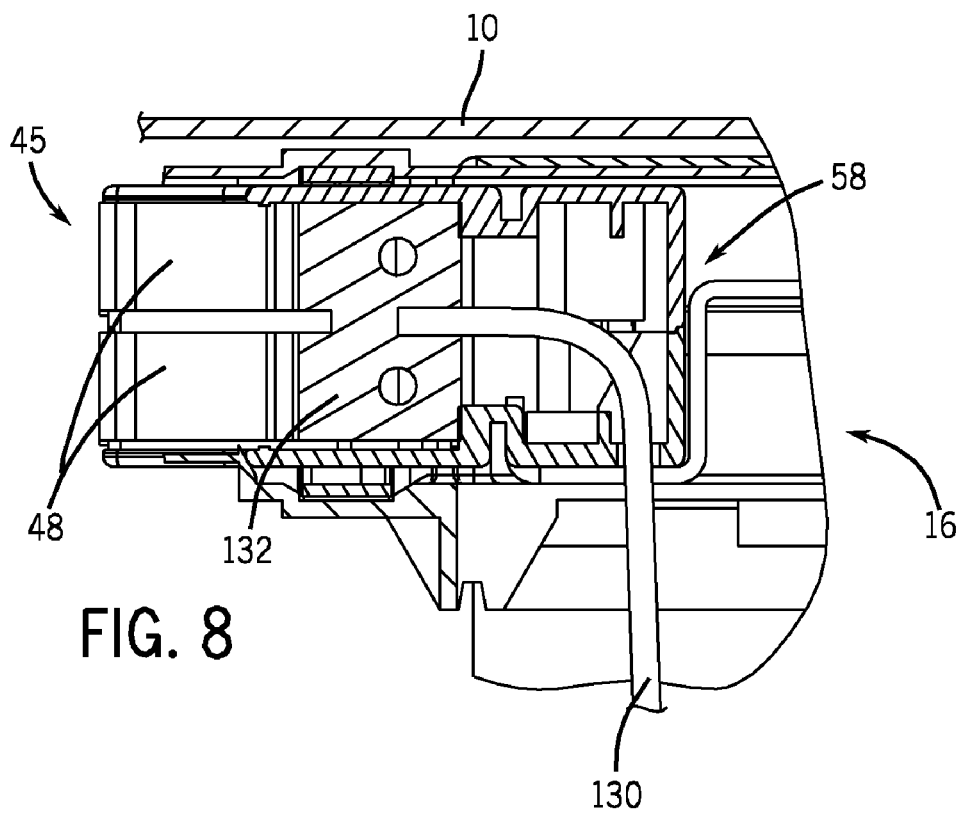
FIG. 8 is a detailed view of the motor control center subunit of FIG. 7 showing line contact extension.

FIG. 7 is an enlarged view of the stab 48 and shutter 66 area of the cross-sectional view of FIG. 6. Conductive stab 48 is coupled to a flexible conductor 130, such as a cable, via a coupling portion 132 of stab assembly 58. Flexible conductor 130 is of a construction suitable to conduct supply power, via stab 48, to the line side of a motor control component (not shown). As shown in FIG. 8, when stab 48 and stab assembly 58 are racked or otherwise advanced forward to an extended position 45, flexible conductor 130 flexes to maintain electrical connectivity with stab 48 via coupler 132. Accordingly, the motion of stab 48 relative to bucket 16 does not interfere with the connectivity of the stab 48 with a motor control component.

Figure 9:
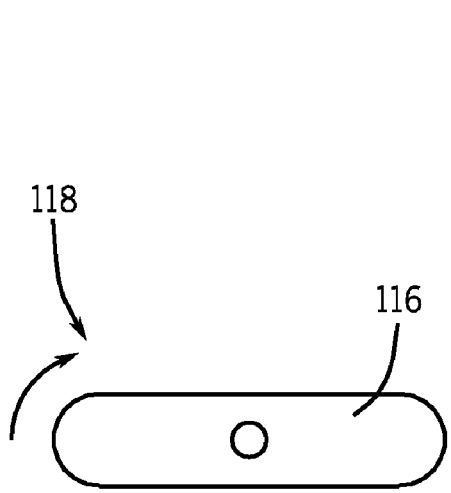
FIG. 9 is a plan view of a control handle of one embodiment of the present invention.
Figure 10:
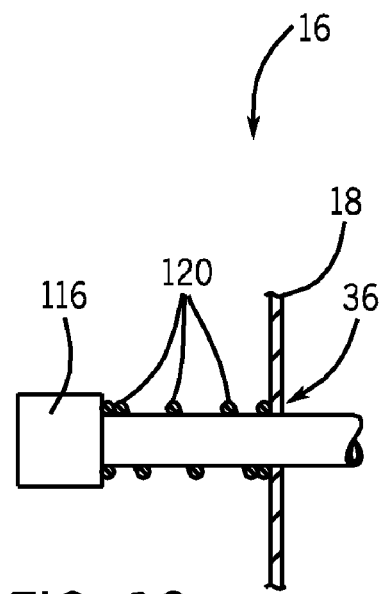
FIG. 10 is a side view of the control handle of FIG. 9.
Figure 11:
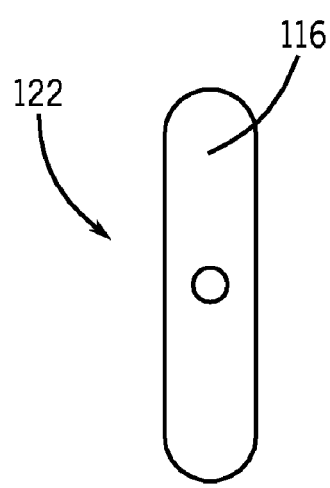
FIG. 11 is a plan view showing the control handle of FIG. 9 rotated ninety degrees.
Figure 12:
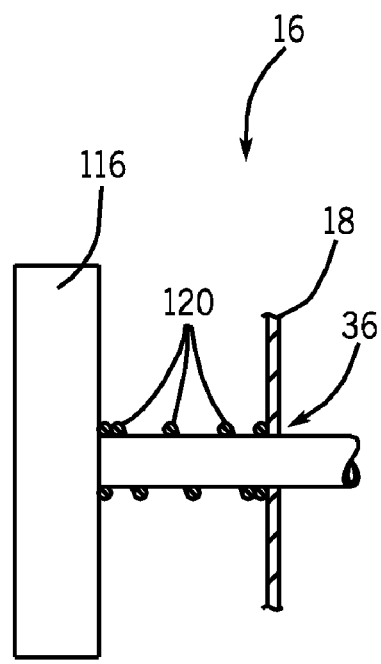
FIG. 12 is a side view of the control handle of FIG. 11.
Figure 13:
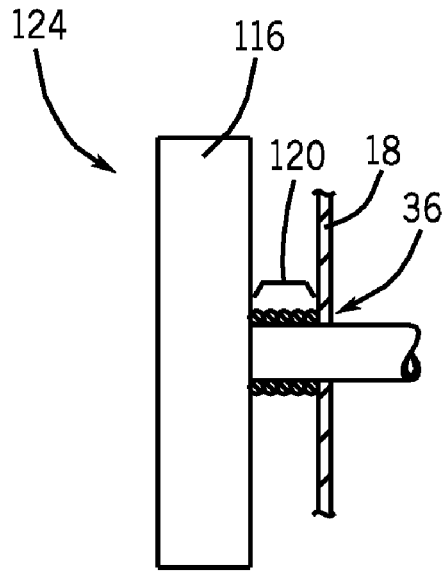
FIG. 13 is a side view showing the control handle of FIG. 11 depressed into a motor control center subunit.
Figure 14:
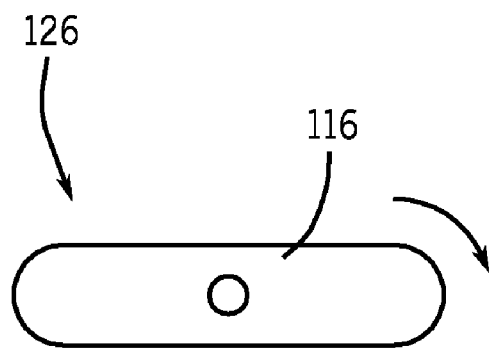
FIG. 14 is a plan view showing the control handle of FIG. 11 rotated ninety degrees.
Figure 15:
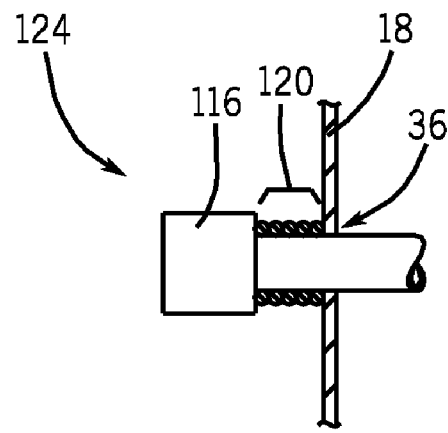
FIG. 15 is side view of the control handle of FIG. 14.

Referring now to FIGS. 9-15, an alternative stab actuating feature is shown. A manually drivable handle 116 may replace or be used in combination with the crank 34 of FIG. 1 and racking mechanism of FIG. 6. In such embodiments, the rotary shaft or worm gear 84 depicted in previous embodiments may be replaced with a non-tapped shaft or rod directly connected to stab assembly 58. FIG. 9 shows such a handle 116 in a locked, starting position 118 that corresponds to the stabs disengaged position 42 of FIG. 3. As shown in FIG. 10, handle 116 is separated and biased from front panel 18 of a bucket by a spring 120 and extends through stab actuating opening 36. By rotating handle 116 ninety degrees, as shown in FIGS. 11 and 12, handle 116 may be unlocked 122. In some embodiments, an interlock system may be included to prevent unlocking of handle 116 until bucket 16 is fully installed into a motor control center. Such an interlock may be incorporated into the shaft 84 of handle 116. Once unlocked, handle 116 may be driven or depressed towards front panel 16, compressing spring 120, as shown in FIG. 14. The depressed position 124 of handle 116 corresponds to the stabs engaged position of FIG. 5. Handle 116 may then be rotated another ninety degrees 126, as shown in FIG. 15, to lock the handle in the stabs engaged position 124, against the force of spring 120. For disengagement of the stabs, handle 116 is rotated to unlocked orientation 122, pulled outward to the stab disengaged position 42 and turned ninety degrees to a locked position 118. In a general sense, therefore, embodiments of the present invention may include various configurations of simplified, manual actuation of the stabs, similar to that shown in FIGS. 9-15.

Figure 16:
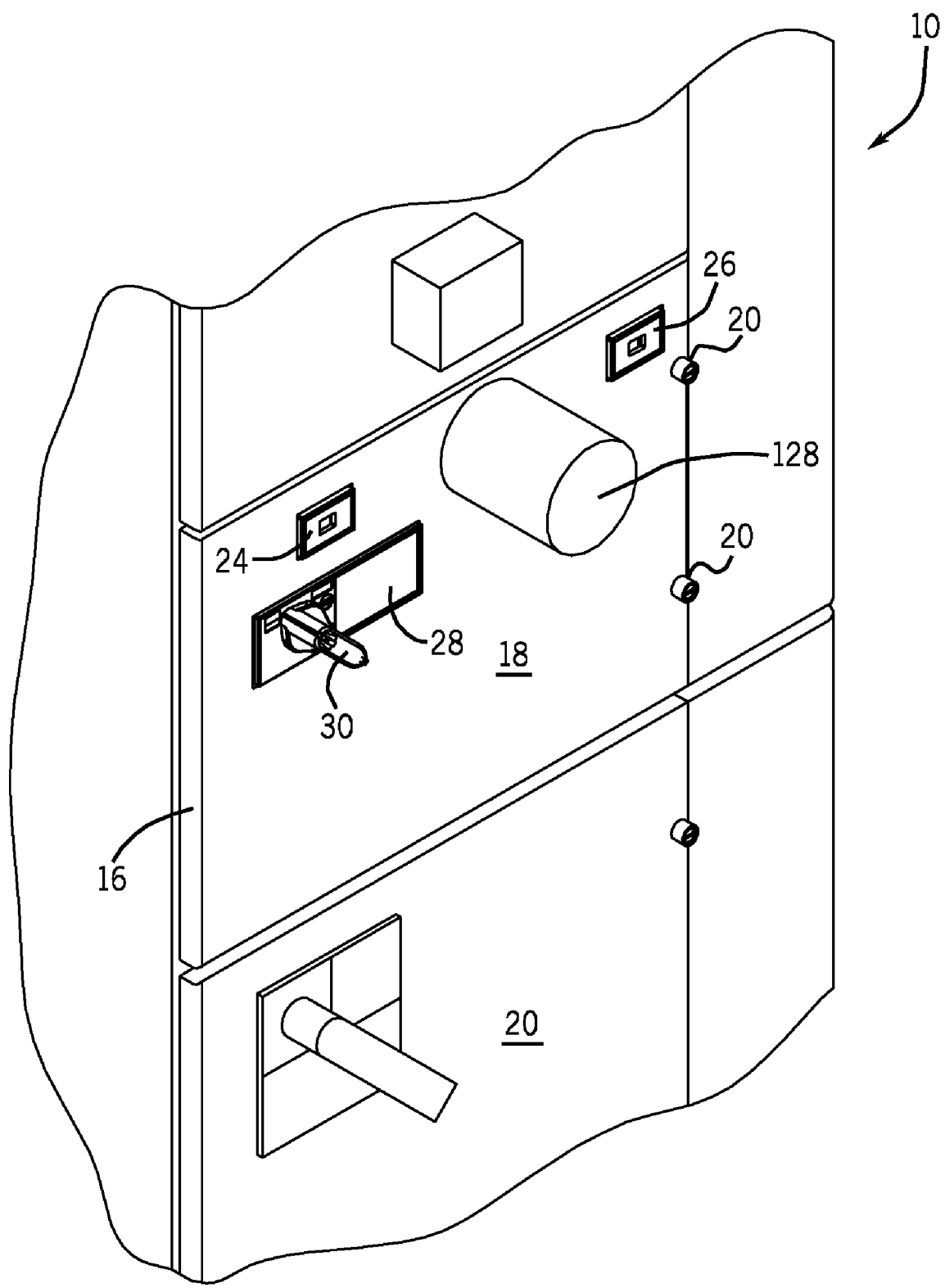
FIG. 16 is a partial perspective view of the motor control center subunit of FIG. 1 showing an alternate embodiment.

In other embodiments, it may be desirable to use more automated actuation of the stabs of a motor control center bucket. Accordingly, FIG. 16 depicts an embodiment of a motor control center bucket 16 in which a motor drive 128 is included. Motor drive 128 may replace or augment a racking mechanism or a manual actuation system, such as described above. Preferably, motor drive 128 is a small DC motor and may be powered by a battery or by an electrical connection with motor control center 10, such as via the control power contact 44 shown in FIG. 2 or a similar plug or connection. It is recognized, however, that many other types, sizes, and configurations of motor drive 128 are equivalently applicable. For example, it may be desirable to connect motor drive 128 inside bucket 16. Further, it is contemplated that motor drive 128 could be remotely operable, and could be either hardwired or wirelessly connected for operation. It is also contemplated that motor drive 128 may be connected remotely via an elongated shaft or cable to operate rotary shaft 84 from a distance.

Accordingly, one embodiment of the present invention includes a control module for a motor control center. The control module includes a housing having a plurality of conductive contacts therein and a front panel, the control module being designed to seat in a motor control center such that the front panel forms a front face of the motor control center. The control module also includes an engagement mechanism which is attached to the housing and is in operable association with the plurality of conductive contacts. The engagement mechanism moves the plurality of conductive contacts between a retracted position and an extended position while the control module housing is seated in the motor control center and the front panel is in a closed position.

Another embodiment of present invention includes a method for manufacturing a control module for a motor control center in which a control module housing is assembled to have at least a front panel and to seat in a motor control center, a moveable guide is disposed within the control module housing to guide motion of at least one supply contact from a first position to a second position, and the at least one supply contact is attached to the moveable guide. The method also includes providing for advancement of the at least one supply contact and the moveable guide when the front panel of the control module housing is secured against the motor control center compartment.

In another embodiment of the present invention, a motor control center subunit includes a subunit housing, an actuating mechanism, and an isolator assembly. The subunit housing is designed to be installed in a motor control center. The actuating mechanism is disposed within the subunit housing and is constructed to move a plurality of line connectors between a retracted position and an extended position. The isolator assembly is configured to electrically shield the plurality of line connectors prior to engagement of the plurality of line connectors with a line power.

In accordance with another embodiment of the present invention, a motor control center is provided. The motor control center includes a frame enclosing a supply power bus and having at least one compartment, and at least one control unit. The at least one control unit is configured for substantially sealed installation in the at least one compartment, and includes at least one supply power contact, a drive configured to move the at least one supply power contact for engagement and disengagement with the supply power bus, and a drive actuator designed to actuate the drive from without the control unit when the control unit is installed in the at least one compartment.

The present invention has been described in terms of the preferred embodiment, and it is recognized that equivalents, alternatives, and modifications, aside from those expressly stated, are possible and within the scope of the appending claims.

What is claimed is:

1. A control module for a motor control center comprising:
a control module housing having a plurality of conductive contacts therein, the control module housing having a front panel and designed to seat in a motor control center wherein the front panel forms a front face of the motor control center;
an engagement mechanism attached to the housing and in operable association with the plurality of conductive contacts to move the plurality of conductive contacts between a retracted position and an extended position while the control module housing is seated in the motor control center and the front panel is in a closed position; and
a control power conductor accessible from outside the control module housing and configured to engage a control power supply and conduct a control power to control components within the control module housing.

2. The control module of claim 1 further comprising an isolator assembly configured to alternatingly shield the plurality of conductive contacts from, and expose the plurality of conductive contacts to, at least one supply bus.

3. The control module of claim 2 wherein the isolator assembly is further configured to open and close at least one shutter to alternatingly shield and expose the plurality of conductive contacts.

4. The control module of claim 1 wherein the front panel of the control module housing substantially seals shut a compartment of the motor control center when in the closed position.

5. The control module of claim 1 wherein the engagement mechanism comprises at least one of a rotary drive mechanism, a hand-operable mechanism, and a motor drive mechanism.

6. The control module of claim 1 further comprising a conductive contacts assembly configured to position the plurality of conductive contacts for engagement with at least one supply bus when the plurality of conductive contacts is in the extended position.

7. The control module of claim 6 wherein the contacts assembly is further configured to translate a movement of the engagement mechanism into a movement of the plurality of conductive contacts.

8. The control module of claim 1 wherein the front panel is one of hinged or fixedly attached to the control module housing.

9. A method of manufacturing a control module for a motor control center comprising:
assembling a control module housing to seat in a motor control center compartment, the control module housing having at least a front panel constructed to securely seal against an inner periphery of the motor control center compartment to contain arc flash;
disposing a moveable guide within the control module housing to guide motion of at least one supply contact from a first position to a second position;
attaching the at least one supply contact to the moveable guide;
providing for advancement of the at least one supply contact and the moveable guide when the front panel of the control module housing is secured against the motor control center compartment; and
providing a control power contact accessible from outside the control module housing to engage a control power supply and provide control power to a motor control component of the control module.

10. The method of claim 9 wherein disposing a moveable guide within the control module includes arranging the moveable guide to linearly translate the at least one supply contact between the first position and the second position.

11. The method of claim 9 wherein attaching the at least one supply contact to the moveable guide includes attaching three supply contacts to the moveable guide for connection to a three phase power supply.

12. The method of claim 9 further comprising positioning a shield assembly at an end of the control module housing opposite the front panel.

13. The method of claim 12 wherein positioning the shield assembly includes disposing at least one moveable shutter within the shield assembly to alternatingly isolate and expose the at least one supply contact.

14. The method of claim 9 further comprising forming an opening in the front panel to permit actuation of the moveable guide therethrough.

15. The method of claim 9 wherein providing for advancement of the at least one supply contact includes providing at least one of a rotary drive for crank operation, a handle for manual operation, and an electric motor for motor-driven operation.

16. A motor control center subunit comprising:
a subunit housing designed to be installed in a motor control center and having a front panel to substantially seal against a periphery of an enclosure of the motor control center when the subunit housing is installed therein;
an actuating mechanism disposed within the subunit housing and constructed to move a plurality of line connectors between a retracted position and an extended position;
an isolator assembly configured to electrically shield the plurality of line connectors prior to engagement of the plurality of line connectors with a line power;
a control power conductor accessible from outside the subunit housing and configured to engage a control power supply and conduct a control power to control components within the subunit housing; and
wherein the front panel includes an opening formed therein designed to permit operation of the actuating mechanism when the subunit housing is installed in the motor control center and the front panel is substantially sealed against the periphery of the enclosure of the motor control center.

17. The motor control center subunit of claim 16 wherein the plurality of line connectors is disposed inside the subunit housing when in the retracted position and extends outside the subunit housing when in the extended position.

18. The motor control center subunit of claim 16 further comprising at least one interlock connected to retain the subunit housing in the enclosure of the motor control center during engagement of the plurality of line connectors with the line power.

19. The motor control center subunit of claim 16 wherein the actuating mechanism comprises at least one of a cranking mechanism, a remotely controllable motor, and an insertable handle.

20. The motor control center subunit of claim 16 further comprising a plurality of flexible conductor cables electrically connected to the plurality of line connectors to conduct power therefrom to a line side of control components within the subunit housing.

21. The motor control center subunit of claim 16 wherein the plurality of line connectors includes three stabs configured to establish electrical communication with a set of three-phase bus bars.

22. The motor control center subunit of claim 16 wherein the isolator assembly further comprises at least one pair of angled shutter surfaces engageable by the plurality of line connectors.

23. The motor control center subunit of claim 16 wherein the actuating mechanism is further constructed to:
advance the plurality of line connectors to a test position intermediate of the retracted position and the extended position; and
wherein advancement of the plurality of line connectors to the test position actuates a microswitch to permit conducting of the control power from the control power supply to the control components.

24. A motor control center comprising:
a frame enclosing a supply power bus, the frame having at least one compartment;

at least one control unit configured for substantially sealed installation in the at least one compartment, the control unit comprising:
- a front panel to form a front face of the motor control center when the at least one control unit is installed in the motor control center;
- at least one supply power contact;
- a drive configured to move the at least one supply power contact for engagement and disengagement with the supply power bus;
- a drive actuator designed to actuate the drive from outside the control unit when the control unit is installed in the at least one compartment and the front panel has substantially sealed the at least one control unit in the at least one compartment; and
- a control power contact accessible from outside the control unit and constructed to engage a control power supply and provide control power to a motor control component of the control unit.

25. The motor control center of claim 24 wherein the power control contact comprises a fixed control power contact.

26. The motor control center of claim 24 wherein the at least one control unit further comprises a contact guide configured to translate movement of the drive to linearly move the at least one supply power contact for engagement and disengagement with the supply power bus.

27. The motor control center of claim 26 wherein the drive and the contact guide are arranged to move the plurality of contacts a distance such that the plurality of contacts are within the control unit when fully disengaged from the supply power bus and are outside the control unit when engaged with the supply power bus.

28. The motor control center of claim 24 wherein the drive of the at least one control unit comprises a rotary shaft.

29. The motor control center of claim 24 wherein the at least one control unit further comprises an isolator assembly configured to alternatingly shield and expose the at least one line contact to the supply power bus.

30. The motor control center of claim 24 wherein the drive actuator of the at least one control unit comprises at least one of a motor, a handle, and a crank.

31. The motor control center of claim 24 wherein the front panel is one of hinged to the at least one control unit to provide access to components therein and fixedly attached to the at least one control unit.

* * * * *

UNITED STATES PATENT AND TRADEMARK OFFICE
CERTIFICATE OF CORRECTION

PATENT NO. : 7,688,572 B2
APPLICATION NO. : 11/625088
DATED : March 30, 2010
INVENTOR(S) : Yee et al.

It is certified that error appears in the above-identified patent and that said Letters Patent is hereby corrected as shown below:

Col. 11, line 20 (Claim 25), delete "power control contact" and substitute therefore -- control power contact --.

Signed and Sealed this

Thirteenth Day of July, 2010

David J. Kappos
*Director of the United States Patent and Trademark Office*